(12) United States Patent
Lee et al.

(10) Patent No.: US 9,392,548 B2
(45) Date of Patent: Jul. 12, 2016

(54) METHOD OF CONTROLLING FOR TRANSMISSION POWER AND DEVICE THEREFOR

(71) Applicant: Samsung Electronics Co., Ltd., Gyeonggi-do (KR)

(72) Inventors: Jong Won Lee, Gyeonggi-do (KR); Soon Park, Gyeonggi-do (KR); Yong Jun Park, Gyeonggi-do (KR); Hyun Ju Hong, Gyeonggi-do (KR); Jong Hyun Park, Gyeonggi-do (KR); Ki Joong Kwon, Gyeonggi-do (KR); Duck Su Kim, Yongin-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/683,347

(22) Filed: Apr. 10, 2015

(65) Prior Publication Data

US 2015/0296460 A1  Oct. 15, 2015

(30) Foreign Application Priority Data

Apr. 10, 2014  (KR) ............ 10-2014-0043265

(51) Int. Cl.
*H04B 7/00* (2006.01)
*H04W 52/04* (2009.01)
(Continued)

(52) U.S. Cl.
CPC ............. *H04W 52/04* (2013.01); *H04B 1/3838* (2013.01); *H04W 52/283* (2013.01); *H04W 52/34* (2013.01); *H04W 52/367* (2013.01); *H04W 52/38* (2013.01); *H04B 5/0031* (2013.01); *H04M 2250/12* (2013.01); *H04W 4/008* (2013.01); *H04W 52/226* (2013.01);
(Continued)

(58) Field of Classification Search
CPC .... H04W 52/283; H04W 4/008; H04W 84/12
USPC ..................... 455/41.2, 522, 569.1
See application file for complete search history.

(56) References Cited

U.S. PATENT DOCUMENTS 6,456,856 B1  9/2002  Werling et al.
7,146,139 B2  12/2006  Nevermann
(Continued)

FOREIGN PATENT DOCUMENTS

EP  2 696 633 A1  2/2014
JP  2000-124828 A  4/2000
(Continued)

OTHER PUBLICATIONS

InterDigital: Impact of P-MPR on HSPA, 3rd Generation Partnership Project, Mobile Competence Centre, XP050568366, Jan. 30, 2012.

*Primary Examiner* — Tu X Nguyen
(74) *Attorney, Agent, or Firm* — Cha & Reiter, LLC.

(57) ABSTRACT

In various embodiments, a method for controlling device transmission power is disclosed. The method may include performing communication at first transmission power using a first communication module, performing communication at a second transmission power using a second communication module, and/or adjusting a transmission power of the first communication module from the first transmission power to a second transmission power for at least a part of time while performing communication using the second communication module.

17 Claims, 15 Drawing Sheets

(51) Int. Cl.
  *H04B 1/3827* (2015.01)
  *H04W 52/28* (2009.01)
  *H04W 52/34* (2009.01)
  *H04W 52/36* (2009.01)
  *H04W 52/38* (2009.01)
  *H04B 5/00* (2006.01)
  *H04W 4/00* (2009.01)
  *H04W 52/22* (2009.01)
  *H04W 52/24* (2009.01)
  *H04W 84/12* (2009.01)
  *H04W 88/06* (2009.01)

(52) U.S. Cl.
  CPC ............ *H04W 52/246* (2013.01); *H04W 84/12* (2013.01); *H04W 88/06* (2013.01)

(56) References Cited

U.S. PATENT DOCUMENTS

| | | | |
|---|---|---|---|
| 8,160,632 | B2 | 4/2012 | Lee et al. |
| 8,340,578 | B2 | 12/2012 | Tolentino et al. |
| 8,928,538 | B2 | 1/2015 | Montgomery et al. |
| 8,954,121 | B2 | 2/2015 | Kanj et al. |
| 8,988,288 | B2 | 3/2015 | Handro et al. |
| 2003/0064761 | A1 | 4/2003 | Nevermann |
| 2008/0176594 | A1 * | 7/2008 | Song et al. |
| 2009/0286576 | A1 | 11/2009 | Lee et al. |
| 2011/0081858 | A1 | 4/2011 | Tolentino et al. |
| 2011/0122035 | A1 | 5/2011 | Montgomery et al. |
| 2012/0184215 | A1 | 7/2012 | Malinen |
| 2012/0315847 | A1 | 12/2012 | Li et al. |
| 2013/0099956 | A1 | 4/2013 | Fratti |
| 2013/0182589 | A1 | 7/2013 | Tolentino et al. |
| 2013/0217450 | A1 | 8/2013 | Kanj et al. |
| 2013/0237272 | A1 | 9/2013 | Prasad |
| 2014/0015718 | A1 | 1/2014 | Handro et al. |
| 2014/0015720 | A1 | 1/2014 | Handro et al. |
| 2014/0274179 | A1 * | 9/2014 | Zhu .................... H04W 52/243 455/509 |
| 2015/0084819 | A1 | 3/2015 | Montgomery et al. |

FOREIGN PATENT DOCUMENTS

| | | |
|---|---|---|
| JP | 2001-244843 A | 9/2001 |
| JP | 2014-7699 A | 1/2014 |
| KR | 10-2008-0037151 A | 4/2008 |
| KR | 10-0819882 B1 | 4/2008 |
| KR | 10-2009-0118343 A | 11/2009 |
| KR | 10-2012-0090080 A | 8/2012 |
| WO | 2012/122116 A1 | 9/2012 |

* cited by examiner

METHOD OF CONTROLLING FOR TRANSMISSION POWER AND DEVICE THEREFOR

CLAIM OF PRIORITY

The priority of Korean patent application No. 10-2014-0043265 filed on Apr. 10, 2014, the disclosure of which is hereby incorporated in its entirety by reference, is claimed.

BACKGROUND

1. Field of the Disclosure

The present disclosure relates to an electronic device and a method for adjusting transmission power of the electronic device.

2. Field of the Disclosure

With the rapid development of information and communication technology, network devices such as base stations have been recently installed all over the country so that electronic devices exchange data with other electronic devices through a network, thereby allowing users to access the network anywhere in the country.

However, electronic devices radiate electromagnetic energy while transmitting/receiving data, and a portion of the radiated energy may be absorbed by the human body. Since the energy absorbed by the human body may adversely affect the human body, various countries establish criteria of a specific absorption rate (SAR) to prevent electronic devices of which the SARs are higher than a certain level from being distributed.

In addition, as electronic devices have higher performance and a smaller size, a plurality of elements are densely mounted within a small housing, causing the issue of heating of the electronic devices.

Since the electromagnetic energy radiated from electronic devices may adversely affect the human body as described above, attention on this issue is required. Intensity of the radiated electromagnetic energy is related to transmission power of a communication module of the electronic devices.

SUMMARY

Various embodiments of the present disclosure are directed to providing an electronic device and a method for adjusting transmission power of a communication module of the electronic device.

According to an embodiment of the present disclosure, a method performed by an electronic device includes performing communication at a first transmission power using a first communication module, performing communication at a second transmission power using a second communication module, and adjusting a transmission power of the first communication module from the first transmission power to a second transmission power for at least a part of time while performing communication using the second communication module.

According to another embodiment of the present disclosure, an electronic device includes a first communication module configured to perform communication at a first transmission power, a second communication module configured to perform communication at a second transmission power, and a control module configured to adjust a transmission power of the first communication module from the first transmission power to a second transmission power for at least a part of time while performing communication using the second communication module.

According to another embodiment of the present disclosure, an electronic device includes a first communication module configured to perform communication using a Wi-Fi network, a second communication module configured to perform communication using a cellular network, a sensor configured to detect a human body, a processor configured to detect whether the electronic device is adjacent to the human body on the basis of a result of detection of the sensor, and a control module configured to adjust a transmission power of the first communication module or the second communication module if the electronic device is adjacent to the human body.

DETAILED DESCRIPTION

Figure 1:
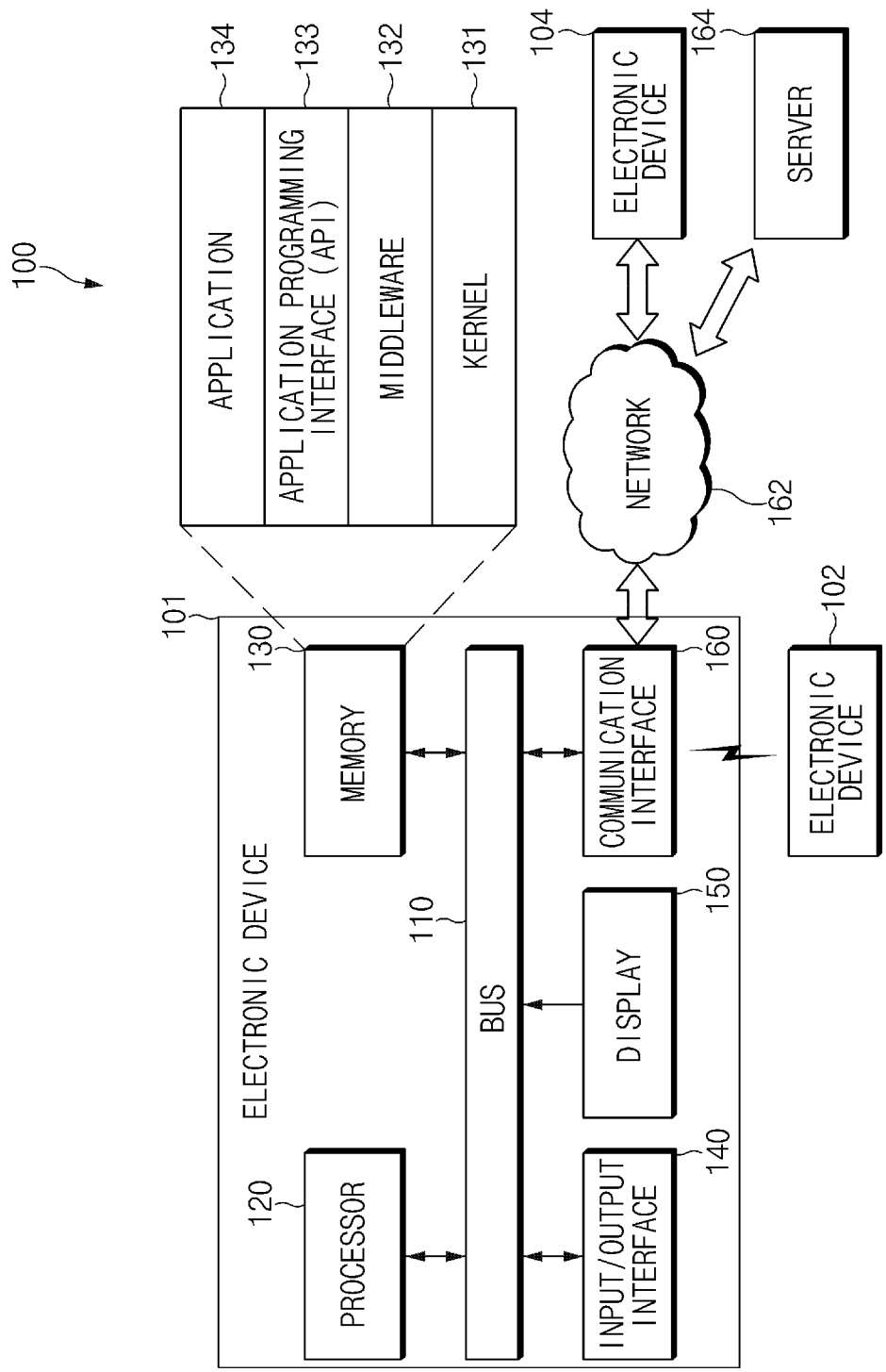
FIG. 1 is a block diagram illustrating an electronic device according to various embodiments of the present disclosure.

Hereinafter, various embodiments of the present disclosure will be described with reference to the accompanying drawings to assist a person of ordinary skill in the art with a comprehensive understanding of various embodiments of the present disclosure as defined by the claims and their equivalents. The present disclosure may be variously modified and may include various embodiments. However, specific embodiments are exemplarily illustrated in the drawings and detailed descriptions related thereto are provided. However, it should be understood that various embodiments of the present disclosure are not limited to specific examples but rather include all modifications, equivalents and alternatives that fall within the sprit and scope of various embodiments of the present disclosure. Regarding the drawings, like reference numerals typically refer to like elements.

As used herein, the terms "include," "including," "includes," "characterize," or "characterized in that" may indicate disclosed functions, operations, or existence of elements but these terms are not intended to exclude other functions, operations or elements. It should be further understood that the terms listed above, as used herein, may specify the presence of stated features, numbers, operations, elements, components, or combinations thereof but do not preclude the presence or addition of one or more other features, numbers, operations, elements, components, or combinations thereof.

The meaning of the term "or" used herein includes any combination of words connected by the term "or". For example, the expression "A or B" may indicate A, B, or both A and B.

The terms such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, a first electronic device and a second electronic device indicate different electronic devices. The first and second electronic devices are not limited to two electronic devices owned by a single user, and may represent any two different electronic devices regardless of users thereof. Furthermore, without departing the scope of the present disclosure, a first element may be named as a second element, and similarly, a second element may be named as a first element.

It will be understood that when an element is referred to as being "connected" or "coupled" to another element, it can be directly connected or coupled to the other element or intervening elements may be present. In contrast, when an element is referred to as being "directly connected" or "directly coupled" to another element, it should be understood that there are no intervening elements.

The terminology used herein is not for delimiting the present disclosure but for describing specific various embodiments of the present disclosure. The terms of a singular form may include plural forms unless otherwise specified.

The terms used herein, including technical or scientific terms, have the same meanings as understood by those skilled in the art unless otherwise defined herein. The commonly used terms such as those defined in a dictionary should be interpreted in the same context as in the related art and should not be interpreted in an idealized or overly formal sense unless otherwise defined explicitly.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" used herein may include at least one of an application-specific integrated circuit (ASIC) chip, a field-programmable gate array (FPGA), or a programmable-logic device for performing some operations, which are known or will be developed.

Electronic devices according to various embodiments of the present disclosure may have a communication function. For example, the electronic devices may include at least one of smartphones, smartpads, tablet personal computers (PCs), mobile phones, video telephones, electronic book readers, desktop PCs, laptop PCs, netbook computers, personal digital assistants (PDAs), portable multimedia players (PMPs), MP3 players, mobile medical devices, cameras, or wearable devices (e.g., head-mounted-devices (HMDs) such as electronic glasses, electronic apparel, electronic bracelets, electronic necklaces, electronic accessories, or smart watches According to some various embodiments of the present disclosure, the electronic devices may be smart home appliances having a communication function. The smart home appliances may include at least one of, for example, TVs, DVD players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, or electronic picture frames.

According to some various embodiments of the present disclosure, the electronic devices may include at least one of medical devices (e.g., magnetic resonance angiography (MRA), magnetic resonance imaging (MRI), computed tomography (CT), scanners, and ultrasonic devices), navigation devices, global positioning system (GPS) receivers, event data recorders (EDRs), flight data recorders (FDRs), vehicle infotainment devices, electronic equipment for ships (e.g., navigation systems and gyrocompasses), avionics, or security devices.

According to some various embodiments of the present disclosure, the electronic devices may include at least one of parts of furniture or buildings/structures having communication functions, electronic boards, electronic signature receiving devices, projectors, or measuring instruments (e.g., water meters, electricity meters, gas meters, or wave meters). The electronic devices according to various embodiments of the present disclosure may be one or more combinations of the above-mentioned devices. The electronic devices described herein and according to various embodiments of the present disclosure are not limited to the above-mentioned devices. Hereinafter, an electronic device according to various embodiments of the present disclosure will be described with reference to the accompanying drawings. The term "user" used herein may refer to a person who uses an electronic device or may refer to a device (e.g., an artificial electronic device) that uses the electronic device.

The term "active" used herein may represent a state in which a certain electronic device, an element included in the electronic device, or a function performed by the electronic device is operated or performed. For example, when an electronic device is referred to as being activated, the power of the electronic device may be turned on in some various embodiments of the present disclosure. In other embodiments of the present disclosure, when an electronic device is referred to as being activated, a locked state of the electronic device may be released. For example, when a processor or a designated module (e.g., a communication module, a modem or the like) is referred to as being activated, the processor or the designated module may be in a state of being supplied with power, the processor or the designated module may be in an enabled state in which the processor or the designated module performs a task, or the processor or the designated module may be in an awake state in which the processor or the designated module waits for performing a task.

The term "inactive" used herein may indicate that a certain electronic device, an element included in the electronic device, or a function performed by the electronic device is in a state other than the above-mentioned active states. For example, when an electronic device is referred to as being inactivated, the power of the electronic device may be turned off, or the electronic device may be in a locked state (e.g., a state of being unable to perform a designated function). For example, when a processor or a designated module is referred to as being inactivated, the processor or the designated module may be in a state of being blocked from a power supply, or the processor or the designated module may be in a sleep state in which operation of the processor or the designated module is suspended until a designated control signal (e.g., an awake signal) is supplied.

FIG. 1 is a block diagram illustrating an electronic device 101 in a network environment 100 according to various embodiments of the present disclosure.

Referring now to FIG. 1, the electronic device 101 may include a bus 110, a processor 120, a non-transitory, tangible computer-readable medium (e.g., a memory), such as the memory 130, an input/output interface 140, a display 150, or a communication interface 160.

The bus 110 may be a circuit for connecting the above-mentioned elements to each other and enabling communication (e.g., control message transfer) between the above-mentioned elements.

The processor 120 may include hardware circuitry configured for operation and may receive a command or plurality of commands from another element (e.g., the memory 130, the input/output interface 140, the display 150, or the communication interface 160) through the bus 110, may interpret the received command, and may perform an operation or data processing according to the interpreted command. Hardware, such as the processor as well as other circuitry described herein may be configured for operation as described herein and as will be appreciated by a person of ordinary skill in the art.

The memory 130 may store one or more command or data received from or generated by the processor 120 or another element (e.g., the input/output interface 140, the display 150, or the communication interface 160). The memory 130 may include programming modules such as a kernel 131, middleware 132, an application programming interface (API) 133, or an application 134. Each programming module may include software, firmware, hardware, or a combination of at least two thereof.

The kernel 131 may control or manage system resources (e.g., the bus 110, the processor 120 or the memory 130) used to perform one or more operations or functions of another programming module, for example, the middleware 132, the API 133 or the application 134. Furthermore, the kernel 131 may provide an interface for the middleware 132, the API 133 or the application 134 to access individual elements of the electronic device 101 in order to control or manage the elements.

The middleware 132 may serve as an intermediary between the API 133 or application 134 and the kernel 131 so that the API 133 or application 134 communicates and exchanges data with the kernel 131. Furthermore, the middleware 132 may perform load balancing with respect to operation requests received from a plurality of the applications 134 by using, e.g., a method of assigning a priority for using system resources (e.g., the bus 110, the processor 120 or the memory 130) of the electronic device 101 to at least one of the applications 134.

The API 133, which may include an interface for the application 134 to control one or more functions provided by the kernel 131 or middleware 132, may include at least one interface or function for, for example, file control, window control, image processing, or character control.

The application 134 may include, in various embodiments, an SMS/MMS application, an electronic mail application, a CPU usage information application, an alarm application, or an environment information application (e.g., an application for providing barometric pressure or temperature information). Furthermore, in the case where there exists an external electronic device (e.g., an electronic device 102 or an electronic device 104) that communicates with the electronic device 101, the application 134 may include an application related to information exchange between the electronic device 101 and the external electronic device. For example, the application 134 may include a notification relay application or a device management application for transferring information to the external electronic device or managing the electronic device. The notification relay application may include a function for transferring notification information generated in the electronic device 101 to the external electronic device. For example, the notification relay application may include a function for transferring the notification information to the external electronic device through another application (e.g., an SMS/MMS application, an electronic mail application, a CPU usage information application, an alarm application, or an environment information application). Furthermore, the notification relay application may receive the notification information from the external electronic device. If there exists the external electronic device that communicates with the electronic device 101, the device management application may manage the external electronic device or a service provided by the external electronic device.

For example, the electronic device 101 may transfer, to the external device, transmission power information of a first communication module or a second communication module of the electronic device 101. The external electronic device may generate, on the basis of the transmission power information received from the electronic device 101, control information for controlling transmission power of the first communication module or the second communication module of the electronic device 101 and may transmit the generated control information to the electronic device 101. The electronic device 101 may control, on the basis of the received control information, transmission power of the first communication module or the second communication module through the device management application.

The input/output interface 140 may receive a command or data from a user, and may transfer the command or data to the processor 120 or the memory 130 through the bus 110. The display 150 may show an image, a video or data to a user.

The communication interface 160 may enable communication between the electronic device 101 and the other electronic device 102 or 104 or a server 164. The communication interface 160 may support a short-range communication protocol (e.g., wireless fidelity (Wi-Fi), Bluetooth (BT) or near field communication (NFC)), network communication (e.g., the Internet, a local area network (LAN), a wide area network (WAN), a telecommunication network, a cellular network, a satellite network or a plain old telephone service (POTS)) or a wired communication protocol (e.g., a universal serial bus (USB) or a high definition multimedia interface (HDMI)). For example, a communication protocol (e.g., a short-range communication protocol, a network communication protocol, or a wired communication protocol) may be supported by at least one of the API 133 or the middleware 132. Each of the electronic devices 102 and 104 may be the same (e.g., same type) as the electronic device 101 or may be different (e.g., different type) from the electronic device 101. The communication interface 160 may include the first communication module and the second communication module, which are described above.

Figure 2:
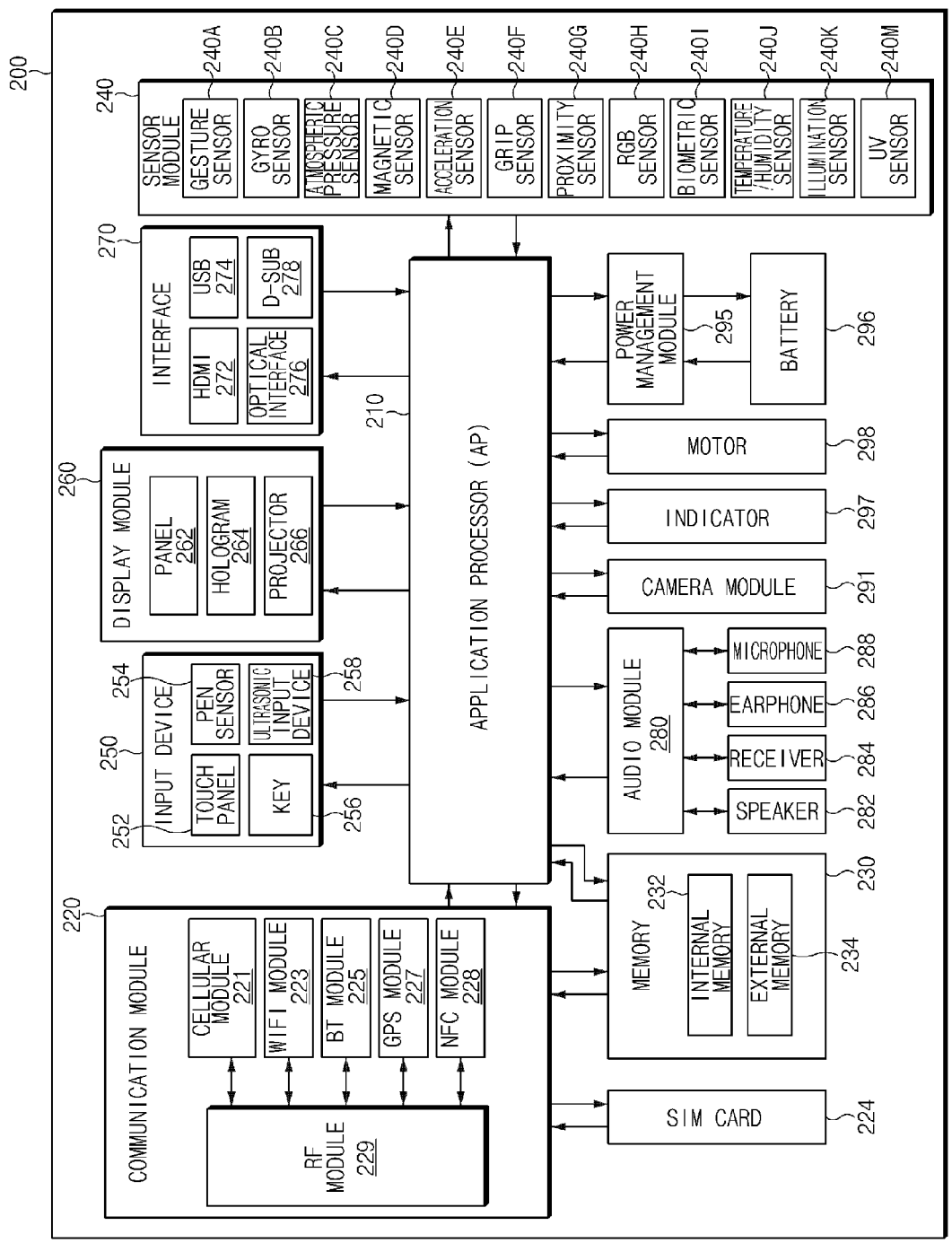
FIG. 2 is a block diagram illustrating hardware of an electronic device according to various embodiments of the present disclosure.

FIG. 2 is a block diagram illustrating hardware of an electronic device 200 according to various embodiments of the present disclosure.

Referring now to FIG. 2, the electronic device 200 may constitute, for example, a part or the entirety of the electronic device 101 illustrated in FIG. 1. For example, an electronic device 200 may include at least one of at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, or a motor 298.

The AP 210 (e.g., the processor 120) may control a plurality of hardware or software elements connected to the AP 210 by running an operating system or an application program, and may process various data including multimedia data and may perform an operation. The AP 210 may be implemented with, for example, a system on chip (SoC). In various embodiments, the AP 210 may further include a graphic processing unit (GPU) (Not shown). However, the AP 210 may be implemented in any other suitable manner.

The communication module 220 (e.g., the communication interface 160) may perform data transmission/reception for communication between the electronic device 200 (e.g., the electronic device 101) and another electronic device (e.g., the electronic device 104 or the server 164) connected thereto through a network. In various embodiments, the communication module 220 may include, in various embodiments, a cellular module 221, a Wi-Fi module 223, a BT module 225, a GPS module 227, an NFC module 228, and a radio frequency (RF) module 229, and/or any other suitable communication module that performs data transmission/reception.

The cellular module 221 may provide a voice call service, a video call service, a text message service, or an Internet service through a telecommunications network (e.g., an LTE, LTE-A, CDMA, WCDMA, UMTS, WiBro or GSM network). Furthermore, the cellular module 221 may identify and authenticate electronic devices in the telecommunications network using, for example, a subscriber identification module (e.g., the SIM card 224). In various embodiments, the cellular module 221 may perform at least a part of functions provided by the AP 210. For example, the cellular module 221 may perform at least a part of a multimedia control function.

In various embodiments, the cellular module 221 may include a communication processor (CP). The cellular module 221 may be implemented with, for example, an SoC. Although FIG. 2 illustrates that the cellular module 221 (e.g., a CP), the memory 230 and the power management module 295 are separated from the AP 210, the AP 210 may include at least a part of the foregoing elements (e.g., the cellular module 221), In various embodiments.

In various embodiments, the AP 210 or the cellular module 221 (e.g., a CP) may load, on a volatile memory, a command or data received from nonvolatile memories connected to the AP 210 and the cellular module 221 respectively or at least one of other elements, so as to process the command or data. Furthermore, the AP 210 or the cellular module 221 may store, in the nonvolatile memory, data received from or generated by at least one of the other elements.

Each of the Wi-Fi module 223, the BT module 225, the GPS module 227 and the NFC module 228 may include, for example, a processor for processing data transmitted/received through the modules. FIG. 2 illustrates that the cellular module 221, the Wi-Fi module 223, the BT module 225, the GPS module 227, and the NFC module 228 are separate blocks. However, in various embodiments, at least a part (e.g., two or more) of the cellular module 221, the Wi-Fi module 223, the BT module 225, the GPS module 227, and the NFC module 228 may be included in a single integrated chip (IC) or IC package. For example, at least a part of processors corresponding to the cellular module 221, the Wi-Fi module 223, the BT module 225, the GPS module 227 and the NFC module 228 respectively (e.g., a communication processor corresponding to the cellular module 221 and a Wi-Fi processor corresponding to the Wi-Fi module 223) may be implemented with a single SoC.

The RF module 229 may transmit/receive data, for example, the RF module 229 may transmit/receive RF signals. For example, a transceiver, a power amp module (PAM), a frequency filter or a low noise amplifier (LNA) may be included in the RF module 229. Furthermore, the RF module 229 may further include a component such as a conductor or a wire for transmitting/receiving free-space electromagnetic waves in a wireless communication system. FIG. 2 illustrates that the cellular module 221, the Wi-Fi module 223, the BT module 225, the GPS module 227, and the NFC module 228 share the single RF module 229. However, in various embodiments, at least one of the cellular module 221, the Wi-Fi module 223, the BT module 225, the GPS module 227, or the NFC module 228 may transmit/receive RF signals through an additional RF module.

The SIM card 224 may include a subscriber identification module, and may be inserted into a slot formed at a specific location of the electronic device. The SIM card 224 may include unique identification information (e.g., an integrated circuit card identifier (ICCID)) or subscriber information (e.g., international mobile subscriber identity (IMSI)).

The memory 230 (e.g., the memory 130) may include an internal memory 232 or an external memory 234. The internal memory 232 may include at least one of a volatile memory (e.g., a dynamic RAM (DRAM), a static RAM (SRAM) or a synchronous dynamic RAM (SDRAM)) or a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

In various embodiments, the internal memory 232 may be a solid state drive (SSD). The external memory 234 may include a flash drive, for example, compact flash (CF), secure digital (SD), micro secure digital (Micro-SD), mini secure digital (Mini-SD), extreme digital (xD) or a memory stick. The external memory 234 may be functionally connected to the electronic device 200 through various interfaces. In various embodiments, the electronic device 200 may further include a storage device (or a storage medium) such as a hard drive.

The sensor module 240 may measure physical quantity or detect an operation state of the electronic device 200 so as to convert measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red/green/blue (RGB) sensor), a biometric sensor 240I, a temperature/humidity sensor 240J, an illumination sensor 240K, or an ultraviolet (UV) sensor 240M. Additionally or alternatively, the sensor module 240 may include, for example, (not shown) an olfactory sensor (E-nose sensor), an electromyography (EMG) sensor, an electroencephalogram (EEG) sensor, an electrocardiogram (ECG) sensor, an infrared (IR) sensor, an iris recognition sensor, or a fingerprint sensor. The sensor module 240 may further include a control circuit for controlling at least one sensor included therein.

The input device 250 may include a touch panel 252, a (digital) pen sensor 254, a key 256, or an ultrasonic input device 258. The touch panel 252 may recognize a touch input using at least one of capacitive, resistive, infrared, and ultraviolet sensing methods. The touch panel 252 may further include a control circuit. In the case of using the capacitive sensing method, a physical contact recognition or proximity recognition is allowed. The touch panel 252 may further include a tactile layer. In this case, the touch panel 252 may provide tactile reaction to a user.

The (digital) pen sensor 254 may be implemented in a similar or same manner as the method of receiving a touch input of a user or may be implemented using an additional sheet for recognition. The key 256 may include, for example, a physical button, an optical button, or a keypad. The ultrasonic input device 258, which is an input device for generating an ultrasonic signal, may enable the electronic device 200 to sense a sound wave through a microphone (e.g., a microphone 288) so as to identify data, wherein the ultrasonic input device 258 is capable of wireless recognition. In various embodiments, the electronic device 200 may use the communication module 220 so as to receive a user input from an external device (e.g., a computer or a server) connected to the communication module 220.

The display 260 (e.g., the display 150) may include a panel 262, a hologram device 264, or a projector 266. The panel 262 may be, for example, a liquid crystal display (LCD) or an active-matrix organic light-emitting diode (AM-OLED). The panel 262 may be, for example, flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. The screen may be disposed in the inside or the outside of the electronic device 200. In various embodiments, the display 260 may further include a control circuit for controlling the panel 262, the hologram device 264, or the projector 266.

The interface 270 may include, for example, a high definition multimedia interface (HDMI) 272, a universal serial bus (USB) 274, an optical interface 276, or a D-subminiature (D-sub) 278. The interface 270 may be included in the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) interface.

The audio module 280 may convert a sound into an electrical signal or vice versa. At least a part of the audio module 280 may be included in the input/output interface 140 illustrated in FIG. 1. The audio module 280 may process sound information input or output through a speaker 282, a receiver 284, an earphone 286, or the microphone 288.

In various embodiments, the camera module 291 for shooting a still image or a video may include at least one image sensor (e.g., a front sensor or a rear sensor), a lens (not shown), an image signal processor (ISP) (not shown), or a flash (e.g., an LED or a xenon lamp) (not shown).

The power management module 295 may manage power of the electronic device 200. Although not illustrated, a power management integrated circuit (PMIC), a charger integrated circuit (IC), or a battery or fuel gauge may be included in the power management module 295.

The PMIC may be mounted on an integrated circuit or an SoC semiconductor. A charging method may be classified into a wired charging method and a wireless charging method. The charger IC may charge a battery, and may prevent an overvoltage or an overcurrent from being introduced from a charger. In various embodiments, the charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, or a rectifier.

The battery gauge may measure, for example, a remaining capacity of the battery 296 and a voltage, current or temperature thereof while the battery is charged. The battery 296 may store or generate electricity, and may supply power to the electronic device 200 using the stored or generated electricity. The battery 296 may include, for example, a rechargeable battery or a solar battery.

The indicator 297 may display a specific state of the electronic device 200 or a part thereof (e.g., the AP 210), such as a booting state, a message state, or a charging state. The motor 298 may convert an electrical signal into a mechanical vibration. A processing device (e.g., a GPU) for supporting a mobile TV may be included in the electronic device 200. The processing device for supporting a mobile TV may process media data according to the standards of digital multimedia broadcasting (DMB), digital video broadcasting (DVB) or media flow.

Each of the above-mentioned elements of hardware according to various embodiments of the present disclosure may be configured with one or more components, and the names of the elements may be changed according to the type of an electronic device. The hardware according to various embodiments of the present disclosure may include at least one of the above-mentioned elements, and some elements may be omitted or other additional elements may be added. Furthermore, some of the elements of the hardware according to various embodiments of the present disclosure may be combined with each other so as to form one entity, so that the functions of the elements may be performed in the same manner as before the combination.

Figure 3:
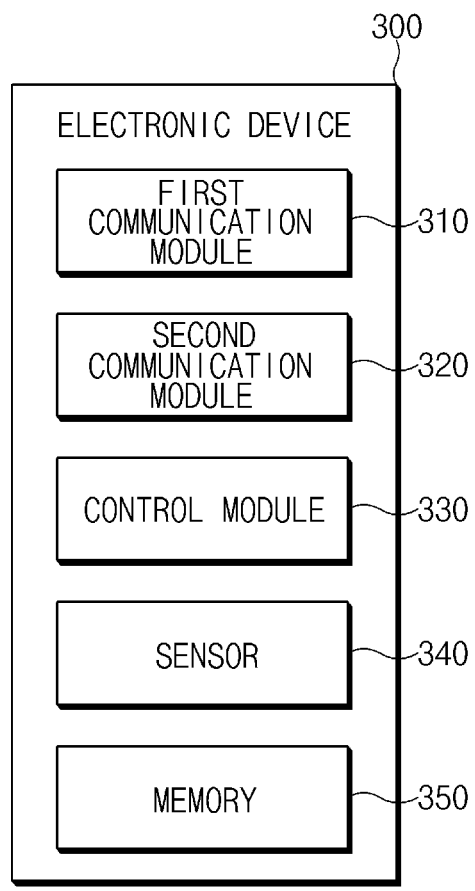
FIG. 3 is a diagram illustrating a configuration of an electronic device according to various embodiments of the present disclosure.

FIG. 3 is a block diagram illustrating an electronic device 300 according to various embodiments of the present disclosure.

Referring to FIG. 3, the electronic device 300 may include a first communication module 310, a second communication module 320, a control module 330, a sensor 340, and a memory 350. However, the electronic device 300 illustrated in FIG. 3 is merely an implementation example of the present disclosure, and various modifications may be made on the basis of the elements illustrated in FIG. 3.

The first communication module 310 and the second communication module 320 may perform communication through different networks. Here, each of the different networks may be any one of a cellular network (e.g., a 3G, LTE, LTE-A, CDMA, WCDMA, UMTS, WiBro, or GSM network), wireless fidelity (Wi-Fi), Bluetooth (BT), near field communication (NFC), Internet, local area network (LAN), wide area network (WAN), telecommunication network, satellite network, plain old telephone service (POTS), Internet of things (IoT), or Internet of everything (IoE).

With continuing reference to FIG. 3, In operation the first communication module 310 or the second communication module 320 may communicate with an external device by transmitting data through a transmitter corresponding to the first communication module 310 or a transmitter corresponding to the second communication module 320 of the electronic device 300. Further, the operation of communicating with an external device may include receiving data through a receiver corresponding to the first communication module 310 or a receiver corresponding to the second communication module 320.

The transmitting of data through the transmitter may include not only transmitting data requested from another electronic device or a server but also transmitting a message for requesting data, a query, and a network ping to the other electronic device or the server. Similarly, the receiving of data through the receiver may include not only receiving data requested to be sent from the other electronic device or the server but also receiving a message containing a data request, a query, and a network ping from the other electronic device or the server.

Furthermore, the data transmitted through the transmitter or the data received through the receiver may include a network beacon and network AP search data.

The first communication module 310 and the second communication module 320 may be simultaneously activated. In this case, subject devices to or from which the first communication module 310 and the second communication module 320 transmit/receive data may be different from each other. For example, the electronic device 300 may communicate with the server 164 of FIG. 1 using the first communication module 310 while communicating with the electronic device 102 of FIG. 1 using the second communication module 320. Here, in the case where the server 164 of FIG. 1 is operated by a communication service provider (e.g., communication carrier) such as SKT™, KT™ or LGT™, the communication with the server 164 using the first communication module 310 may be, for example, an incoming/outgoing call received or transmitted from/to the electronic device 104 through a cellular network.

The first communication module 310 and the second communication module 320 may be activated at different times. For example, various embodiments of the present disclosure may include not only a case where the first communication module 310 and the second communication module 320 are simultaneously activated but also a case where the second communication module 320 is activated after the first communication module 310 is activated and a case where the first communication module 310 is activated after the second communication module 320 is activated.

For example, the electronic device 300 may request data (e.g., map data of Google Maps™) from a server of a content provider (e.g., Google™) through a Wi-Fi network using the second communication module 320, while exchanging calls with the electronic device 104 through a cellular network using the first communication module 310.

In various embodiments, the electronic device 300 may be connected to the electronic device 102 through a short-range wireless communication network (e.g., Wi-Fi, Wi-Fi direct, BT, or ZigBee, etc.) using the second communication module 320, while being connected to a base station of a communication service provider to perform data communication through a cellular network using the first communication module 310. For example, the electronic device 300 may receive cellular data from the base station of the communication service provider in order to form a network coverage (so-called hotspot zone) at the periphery of the electronic device 300 as an access point (AP) and may transmit data for Wi-Fi communication to another electronic device.

Furthermore, the electronic device 300 may perform communication through a prescheduled communication module for a prescheduled time using a time division multiplexing scheme.

The control module 330 may adjust transmission power of each of the first communication module 310 and the second communication module 320. Furthermore, the control module 330 may adaptively adjust or control transmission power of each of the first communication module 310 and the second communication module 320. Herein, a configuration of "adjusting transmission power of the first communication module 310 or the second communication module 320" may be construed as including a configuration of "adaptively adjusting transmission power of each of the first communication module 310 and the second communication module 320".

Here, the control module 330 may be included as one element in a processor to adjust transmission power of the first communication module 310 or the second communication module 320. Alternatively, the control module 330 may be provided as part of a plurality of control modules and may be included in each of the first communication module 310 and the second communication module 320 to individually control the first communication module 310 and the second communication module 320. Alternatively, the control module 330 may be disposed outside the processor independently from the processor to adjust transmission power of the first communication module 310 or the second communication module 320.

In general, if transmission power of a communication module is increased, transmission efficiency is relatively increased. On the contrary, if the transmission power of the communication module is decreased, the transmission efficiency is relatively decreased. However, as described above, as the transmission power of the communication module is increased, a larger amount of electromagnetic energy is radiated, which may have an unhealthy effect upon the human body. Therefore, the control module 330 according to various embodiments of the present disclosure may adjust the transmission power of each of the first communication module 310 and the second communication module 320 in consideration of an amount of electromagnetic energy to be radiated and communication efficiency.

The control module 330 may check the transmission power of the first communication module 310 or the second communication module 320 to adjust the transmission power of the first communication module 310 or the second communication module 320.

The control module 330 may adjust the transmission power of the first communication module 310 or the second communication module 320 on the basis of the checked transmission power of the first communication module 310 or the second communication module 320.

In various embodiments, the control module 330 may check a sum or total amount of the transmission power of the first communication module 310 and the second communication module 320. In this case, the control module 330 may adjust the transmission power of the first communication module 310 or the second communication module 320 so that the sum of the transmission power of the first communication module 310 and the second communication module 320 does not exceed a preset threshold value (or specified ranges). The preset threshold value or the specified ranges may be changed according to a characteristic of the first communication module 310 or the second communication module 320.

The control module 330 may check whether the first communication module 310 and the second communication module 320 simultaneously perform communication using at least one network.

If the first communication module 310 and the second communication module 320 simultaneously perform communication using at least one network, the control module 330 may adjust the transmission power of at least one of the first communication module 310 and the second communication module 320.

For example, in the case where the control module 330 simultaneously performs communication through the first communication module 310 and the second communication module 320 using at least one network, the control module 330 may adjust the transmission power of at least one of the first communication module 310 and the second communication module 320 on the basis of values of a predefined transmission power data table. The transmission power data table is described below in greater in detail with reference to FIGS. 7 and 8.

In various embodiments, the control module 330 may adjust the transmission power of the first communication module 310 or the second communication module 320 on the basis of a contact state between the electronic device 300 and the human body. Here, the contact state between the electronic device 300 and the human body may be detected by the sensor 340. For example, the sensor 340 may detect the contact state using at least one of the sensors included in the sensor module 240 of FIG. 2 (e.g., the gesture sensor 240A, the grip sensor 240F, the proximity sensor 240G, the biometric sensor 240I, the temperature/humidity sensor 240J or the fingerprint sensor), the touch panel 252, or the camera module 291.

For example, the control module 330 may differently adjust the transmission power for a case where the user has a telephone conversation using a speaker (e.g., the speaker 282 of FIG. 2) of the electronic device 300 (i.e., in a speaker phone mode) while placing the electronic device 300 on a table in comparison to a case where the user has a telephone conversation using a receiver (e.g., the receiver 284 of FIG. 2) of the electronic device 300 while holding the electronic device 300 closely to the user's head, ear, or face.

However, in various embodiments, each role of a receiver and a speaker may not be divided from each other according to the type of an electronic device. For example, a smartpad that is relatively less frequently used for a call may not be provided with a receiver, but may be provided with two speakers (a first speaker and a second speaker) having different roles. In this case, and in various embodiments, the first speaker for outputting a sound source may serve to enable the user to listen to the sound source at a certain distance from the first speaker. The second speaker which may replace a receiver may limit a sound volume to serve for an incoming/outgoing call. Thus, in certain embodiments, the control module 330 may differently adjust the transmission power on the basis of whether the first speaker or the second speaker of the smartpad is used.

Furthermore, the control module 330 may adjust the transmission power of the first communication module 310 or the second communication module 320 on the basis of which part of the human body contacts the electronic device 300. For example, the control module 330 may differently make a determination for a case where the electronic device 300 is simply gripped by the user and another case where the electronic device 300 is gripped by the user closely to the user's head to make or receive a call.

According to various embodiments of the present disclosure, the first communication module 310 of the electronic device 300 may correspond to a cellular network and the second communication module 320 may correspond to a Wi-Fi network. In this case, if the communication using the first communication module 310 corresponds to an incoming/outgoing call, the control module 330 may adjust the transmission power of the second communication module 320 to maintain the quality of a call.

In various embodiments, the control module 330 may adjust the transmission power of the first communication module 310 or the second communication module 320 depending upon whether a receiver (e.g., the receiver 284 of FIG. 2) or a microphone (e.g., the microphone 288 of FIG. 2) mounted the electronic device 300 is activated. For instance, if the receiver 284 or the microphone 288 of the electronic device 300 is activated, the electronic device 300 may be considered to be located adjacent to the user's ear or mouth. Therefore, the control module 330 may differently adjust the transmission power for a case where the receiver 284 or the microphone 288 of the electronic device 300 is activated in comparison to a case where the receiver 284 or the microphone 288 of the electronic device 300 is not activated or deactivated.

The control module 330 may further, and in various embodiments, adjust the transmission power of the first communication module 310 or the second communication module 320 on the basis of a temperature of the electronic device 300. The temperature of the electronic device 300 may be detected by the sensor 340. For example, the sensor 340 may sense the temperature using the temperature/humidity sensor 240J included in the sensor module 240 of FIG. 2, the touch panel 252, and/or the camera module 291. Further, the temperature of the electronic device 300 may be measured using at least one of elements of the electronic device 300 of which characteristics are changed by a temperature.

In the case of simultaneously or sequentially using the first communication module 310 corresponding to a cellular network and the second communication module 320 corresponding to a BT network, the control module 330 may maintain the second communication module 320 with minimum power and, in some cases, may turn off the second communication module 320 intermittently or permanently.

Various examples of adjusting or controlling the transmission power of the first communication module 310 or the second communication module 320 by the control module 330 are described below with reference to FIGS. 4 and 5.

Figure 4:
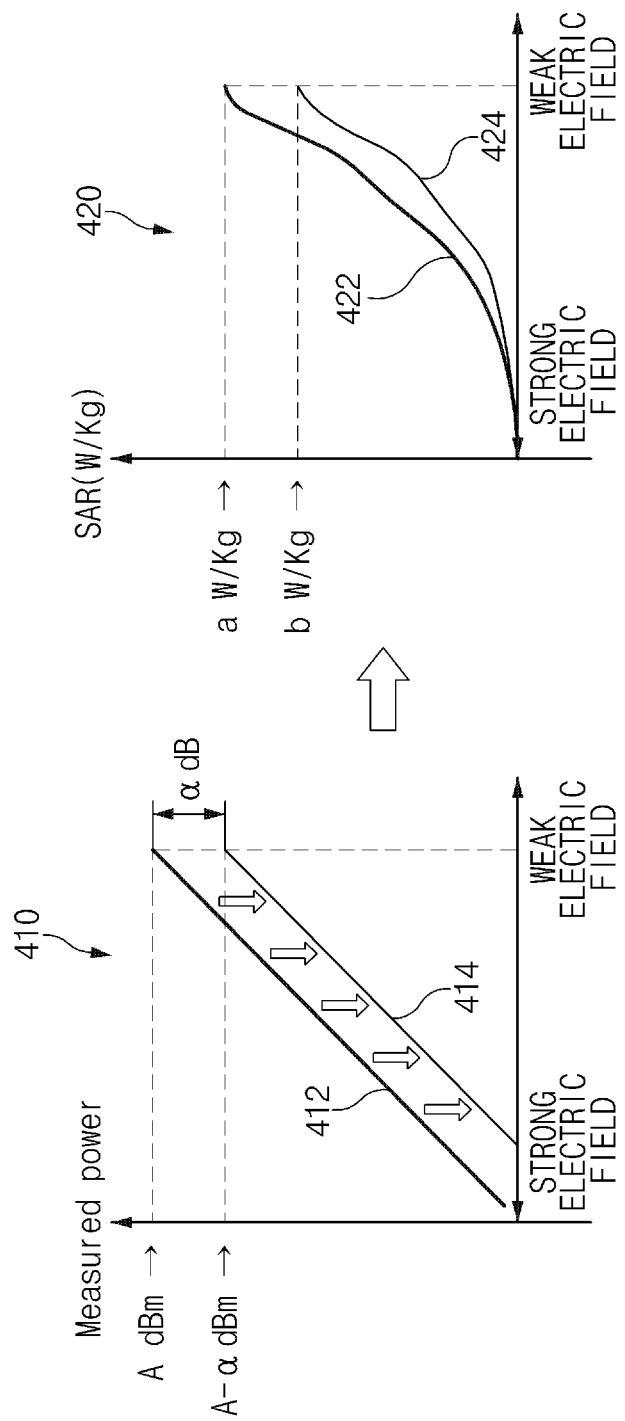
FIG. 4 is a diagram illustrating a method of adjusting transmission power of a communication module according to various embodiments of the present disclosure.

FIG. 4 is a diagram illustrating a method of adjusting or controlling, by the control module 330, the transmission power of the first communication module 310 and/or the second communication module 320 according to various embodiments of the present disclosure.

Referring to FIG. 4, the control module 330 may adjust the transmission power of the first communication module 310 or the second communication module 320 by as much as preset amount (or specified ranges) of power regardless of actual transmission power of the first communication module 310 or the second communication module 320. The preset amount or the specified ranges may be changed according to a characteristic of the first communication module 310 or the second communication module 320.

Regarding a graph 410 of FIG. 4, lines 412 and 414 indicate the transmission power according to an electric field state, wherein the line 412 corresponds to the case where the transmission power is not adjusted and the line 414 corresponds to the case where the transmission power is adjusted. It may be understood from the graph 410 that the transmission power is decreased by as much as a (dBm) as a whole for all electric field states as a result of adjustment of the transmission power.

Regarding a graph 420 of FIG. 4, lines 422 and 424 indicate specific absorption rates (SARs) corresponding to the lines 412 and 414, wherein the line 422 corresponds to the case where the transmission power is not adjusted and the line 424 corresponds to the case where the transmission power is adjusted. It may be understood from the graph 420 that the SAR of the case where the transmission power is adjusted is smaller than that of the case where the transmission power is not adjusted.

According to another embodiment of the present disclosure, the control module 330 may maintain the amount of the transmission power of the first communication module 310 or the second communication module 320 below the preset threshold value. Further, the control module 330 may maintain the sum or the total amount of the transmission power of the first communication module 310 and the second communication module 320 below the preset threshold value.

For example, the control module 330 may maintain the sum of the transmission power of the first communication module 310 and the second communication module 320 below the preset threshold value by adjusting the transmission power of the first communication module 310 and/or the second communication module 320.

Figure 5:
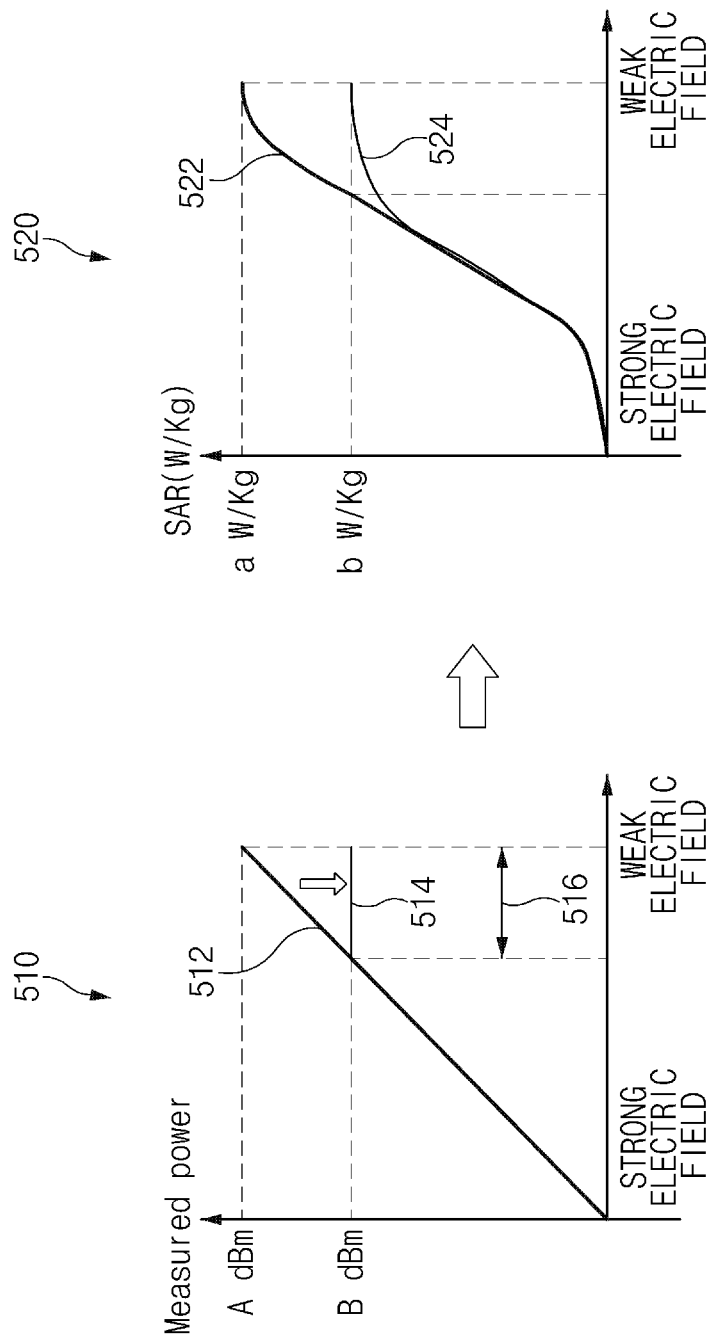
FIG. 5 is a diagram illustrating a method of adjusting transmission power of a communication module according to another embodiment of the present disclosure.

FIG. 5 is a diagram illustrating a method of controlling, by the control module 330, the transmission power of the first communication module 310 and/or the second communication module 320 according to another embodiment of the present disclosure.

In the graph 510, depicted at FIG. 5, lines 512 and 514 indicate transmission power according to an electric field state, in which the line 512 corresponds to the case where the transmission power is not adjusted and the line 514 corresponds to the case where the transmission power is adjusted.

The preset threshold value is represented by the letter B (dBm). It may be understood from the graph 510 that the transmission power of the case where the transmission power is adjusted is maintained as B (dBm) in a region 516 where the transmission power of the case where the transmission power is not adjusted exceeds B (dBm).

Regarding a graph 520 of FIG. 5, lines 522 and 524 indicate SARs corresponding to the lines 512 and 514, wherein the line 522 corresponds to the case where the transmission power is not adjusted and the line 524 corresponds to the case where the transmission power is adjusted. It may be understood from the graph 520 that the SAR of the case where the transmission power is adjusted is smaller than that of the case where the transmission power is not adjusted, with respect to the region 516 where the transmission power is adjusted.

The control module 330 may adjust the transmission power of the first communication module 310 or the second communication module 320 on the basis of the transmission power data table stored in the memory 350. The data table is described below with reference to FIG. 6.

Figure 6:
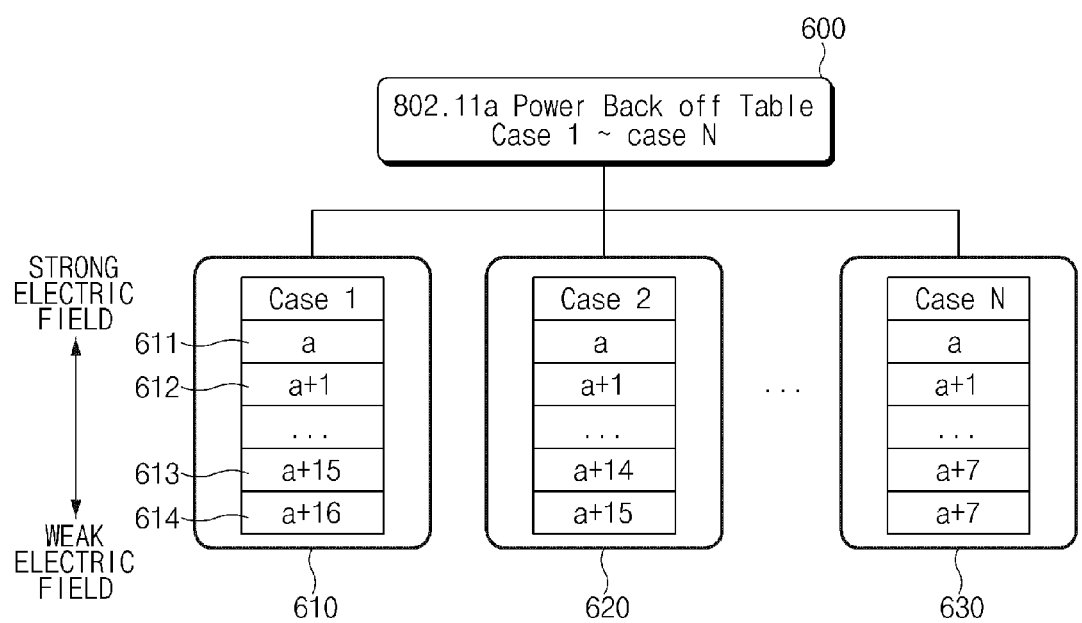
FIG. 6 is a diagram illustrating a data table for adjusting transmission power of a communication module according to various embodiments of the present disclosure.

FIG. 6 is a diagram illustrating a data table 600 for adjusting the transmission power of the first communication module 310 or the second communication module 320 according to various embodiments of the present disclosure.

It should be noted that the data table 600 which is used to adjust the transmission power of the first communication module 310 or the second communication module 320 corresponding to a Wi-Fi network for the 802.11a standard is not limited to the numerical values illustrated in FIG. 6.

The data table 600 may include information for each transmission power adjustment scenario according to various embodiments of the present disclosure.

Referring to a first case 610 and to an Nth case 630, each case contains threshold values (or specified ranges) at least differently set according to the electric field state. For example, regarding the first case 610, the threshold value (or specified ranges) for a strong electric field 611 in which the electric field state is relatively "good" may be set to be a relatively low value, labeled as 'a', but the threshold value (or specified ranges) for a weak electric field 614 in which the electric field state is relatively "bad" may be set to be a relatively high value a+16. Furthermore, since the electric field state of an electric field 612 is worse (weaker) than that of the electric field 611, the threshold value (or specified ranges) may be set to be a+1. Similarly, since the electric field state of an electric field 613 is better (stronger) than that of the electric field 614, the threshold value (or specified ranges) may be set to be a+15. The threshold value or the specified ranges may be changed according to a characteristic of the first communication module 310 or the second communication module 320.

Furthermore, since the transmission power required for protecting the user may be changed according to the scenarios (the first case 610 to the Nth case 630), the data table 600 may be differently set according to the scenarios even for the same network.

According to various embodiments of the present disclosure, each of the first case 610 to the Nth case 630 is based on conditions such as the contact state between the electronic device 300 and the human body (e.g., a simple grip state, a face contact state, a partial human body (e.g., a knee) contact state, or the like) or a distance between the electronic device 300 and the human body, so that an appropriate case for a situation may be selected to adjust the transmission power of the first communication module 310 or the second communication module 320 by the control module 330.

Furthermore, according to various embodiments of the present disclosure, each of the first case 610 to the Nth case 630 is based on conditions such as an antenna location, an antenna type (or the type of the network corresponding to an activated communication module), the case where a plurality of antennas of the same type exist, or the like, so that an appropriate case for a situation may be selected to adjust the transmission power of the first communication module 310 or the second communication module 320. For example, when a plurality of antennas are activated, the control module 330 may adjust the transmission power of the first communication module 310 or the second communication module 320 corresponding to an antenna that is relatively close to the human body. Furthermore, if there are a plurality of antennas of the same type for a multi-input multi-output (MIMO) system, the control module 330 may adjust the transmission power of the first communication module 310 or the second communication module 320 corresponding to a certain antenna on the basis of a result of antenna scheduling or the above-mentioned contact state with human.

The data table 600 may be differently determined on the basis of a frequency of a network corresponding to the first communication module 310 or a network corresponding to the second communication module 320.

For example, although FIG. 6 illustrates the data table 600 for a 802.11a Wi-Fi network, different data tables may be provided for each of 802.11b, 802.11g, 802.11n and 802.11ac Wi-Fi networks.

However, even for the same Wi-Fi network, different data tables may be provided according to an operating frequency. For example, different data tables may be provided for a 802.11n Wi-Fi network operating at a frequency of about 2.4 GHz and a 802.11n Wi-Fi network operating at a frequency of about 5 GHz.

Furthermore, even for the same operating frequency, different data tables may be provided according to a bandwidth. For example, different data tables may be provided for a bandwidth of about 20 MHz and a bandwidth of about 40 MHz with respect to the 802.11n Wi-Fi network operating at a frequency of about 5 GHz. Likewise, different data tables may be provided for a bandwidth of about 20 MHz, a bandwidth of about 40 MHz and a bandwidth of about 80 MHz with respect to the 802.11ac Wi-Fi network operating at a frequency of about 5 GHz.

The data table 600 of FIG. 6 is an example of a Wi-Fi network, and a data table for another network other than a Wi-Fi network may be also stored in the memory 350. Furthermore, it should be noted that various embodiments of the present disclosure do not exclude data tables for Wi-Fi network standards to be developed or not yet commercialized other than the 802.11a/b/g/n/ac standards.

The control module 330 according to another embodiment of the present disclosure may adaptively adjust the transmission power of each of the first communication module 310 and the second communication module 320 in consideration of the amount of electromagnetic energy to be radiated and/or the communication efficiency.

Returning briefly to FIG. 3, the memory 350 may store data. Here, the data stored in the memory 350 may include data input/output between elements of the electronic device 300. Furthermore, the data stored in the memory 350 may include data input/output between the electronic device 300 and elements outside the electronic device 300. For example, the memory 350 may store the data table 600 and may also store information on whether a sensor, a receiver or a microphone is activated.

As described above, the memory 350 may include a hard disk drive, a read only memory (ROM), a random access memory (RAM), a flash memory, and a memory card positioned inside or outside the electronic device 300.

According to various embodiments of the present disclosure, the memory 350 may be included in each of (or either of) the first communication module 310 and/or the second communication module 320 or may be disposed as a single element or plurality of elements outside the communication modules 310 and 320.

The data table 600 may be prestored in the memory of the first communication module 310 or the second communication module 320, or may be stored in an AP (e.g., the AP 210 of FIG. 2) so as to be transferred to the memory of the first communication module 310 or the second communication module 320 when the first communication module 310 or the second communication module 320 is activated.

The first communication module 310, the second communication module 320, the control module 330, the sensor 340, and the memory 350 may be separately implemented and/or two or more of the foregoing elements may be integrated with each other.

Figure 7:
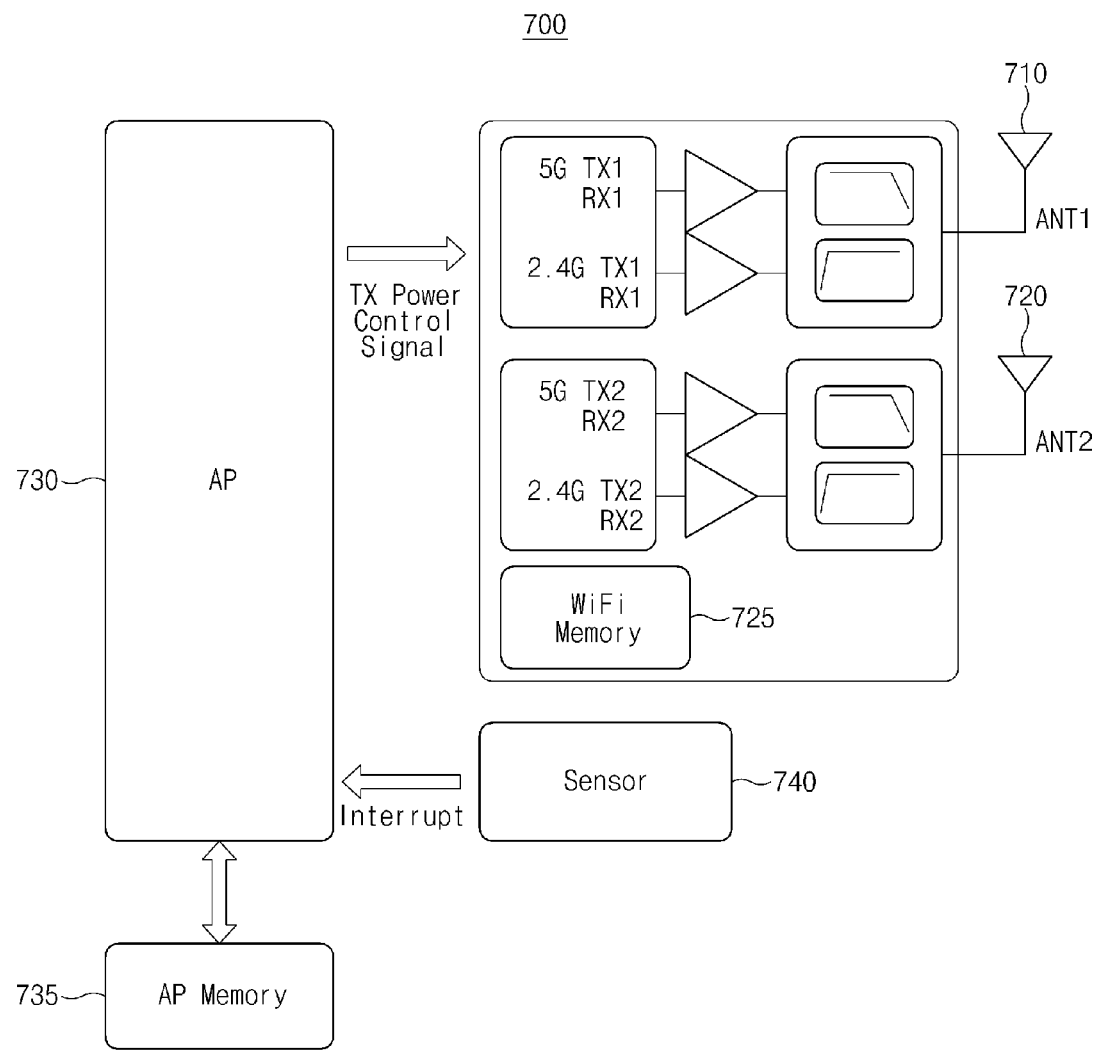
FIG. 7 is a diagram illustrating a configuration of an electronic device according to another embodiment of the present disclosure.

FIG. 7 is a block diagram illustrating an electronic device 700 according to another embodiment of the present disclosure. Referring to FIG. 7, the electronic device 700 may include a first antenna 710, a second antenna 720, a communication memory 725, an AP 730, an AP memory 735, and a sensor 740.

The AP 730 of FIG. 7 may correspond to the control module 330 of FIG. 3, and the sensor 740 of FIG. 7 may correspond to the sensor 340 of FIG. 3. The communication memory 725 or the AP memory 735 of FIG. 7 may correspond to the memory 350 of FIG. 3.

The first antenna 710 may serve for a first communication module of the electronic device 700, and the second antenna 720 may serve for a second communication module of the electronic device 700. Here, the first communication module and second communication module may be simultaneously activated, or a predetermined communication module may be activated for a scheduled time using, for example, a time division multiplexing scheme.

The AP 730 may determine whether the first communication module and second communication module are simultaneously activated or the predetermined communication module is activated for the scheduled time using such a time division multiplexing scheme.

If, for example, the first communication module and second communication module are activated simultaneously or at different times, the AP 730 may adjust the transmission power of the first communication module and/or the second communication module.

For instance, the AP 730 may directly adjust the transmission power of the first communication module and/or the second communication module using the data table stored in the AP memory 735. Moreover, in various embodiments, the AP 730 may read the data table stored in the communication memory 725 to adjust the transmission power of the first communication module or the second communication module. Likewise, the AP 730 may instruct the first communication module and/or the second communication module to adjust the transmission power thereof for itself using the communication memory 725.

Furthermore, in various embodiments, the AP 730 may receive sensor measurement data from the sensor 740, and may determine whether the electronic device 700 contacts the human body on the basis of the sensor measurement data. Moreover, the AP 730 may adjust the transmission power of the first communication module and/or the second communication module in consideration of whether the electronic device 700 contacts the human body.

Figure 8:
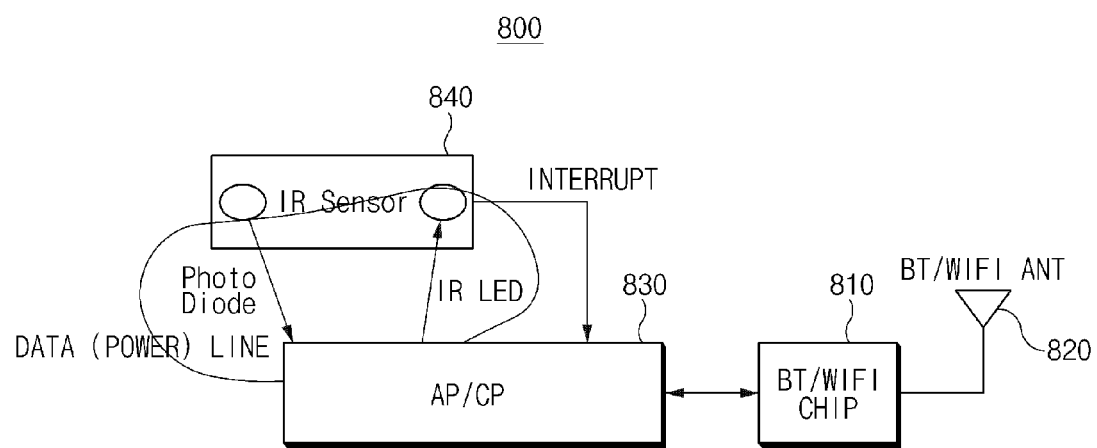
FIG. 8 is a diagram illustrating a configuration of an electronic device according to another embodiment of the present disclosure.

FIG. 8 is a block diagram illustrating an electronic device 800 according to in accordance with the present disclosure. Referring to FIG. 8, the electronic device 800 may include a communication module 810, an antenna 820, an AP/CP 830, and a sensor 840.

The communication module 810 of FIG. 8 may correspond to the first communication module 310 and/or the second communication module 320 of FIG. 3, the AP/CP 830 of FIG. 8 may correspond to the control module 330 of FIG. 3, and the sensor 840 of FIG. 8 may correspond to the sensor 340 of FIG. 3.

The AP/CP 830 may check whether the communication module 810 is activated, and may adjust the transmission power of the communication module 810 if the communication module 810 is activated.

FIG. 8 illustrates that the AP/CP 830 may adjust the transmission power of the communication module 810 for short-range communication, but the network to be adjusted is not limited thereto. For example, the AP/CP 830 may adjust the transmission power of a communication module corresponding to a cellular network.

Furthermore, the AP/CP 830 may receive a sensing value from the sensor 840, and may adjust the transmission power of the communication module 810 on the basis of the sensing value received.

FIG. 8 illustrates that an infrared sensor including a photodiode and an infrared light-emitting diode (IR LED) is used as the sensor 840, but the sensor 840 according to various embodiments of the present disclosure is not limited to the infrared sensor and may include various sensors illustrated in FIG. 2 or 3.

FIGS. 9 to 15 are flowcharts illustrating methods of adjusting, by an electronic device (e.g., the electronic device 300, 700 or 800), the transmission power of a first communication module and/or a second communication module according to various embodiments of the present disclosure. The methods of adjusting the transmission power of the first communication module or the second communication module according to the embodiments illustrated in FIGS. 9 to 15 may include operations that are time-series processed by the electronic devices according to the various embodiments illustrated in FIGS. 1 to 8. Therefore, the above descriptions of the electronic devices of FIGS. 1 to 8 may be applied to the methods of adjusting the transmission power of the first communication module or the second communication module according to the embodiments illustrated in FIGS. 9 to 15.

Figure 9:
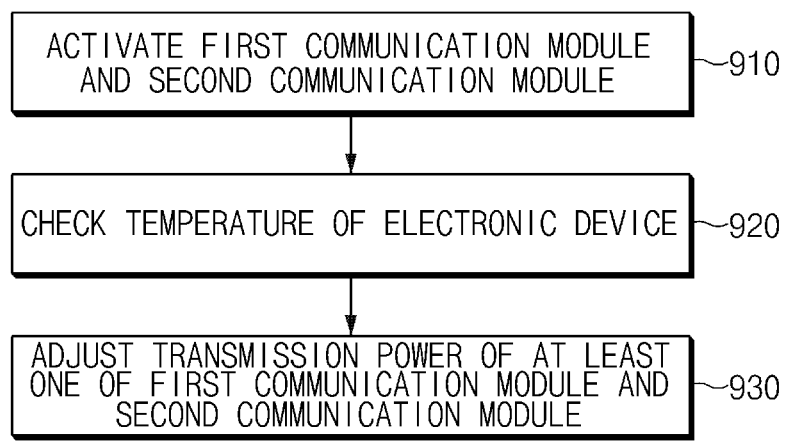
FIG. 9 is a flowchart illustrating a method of adjusting transmission power of a communication module by an electronic device according to various embodiments of the present disclosure.

For instance, referring to FIG. 9, the electronic device may activate the first communication module and the second communication module in operation 910.

In operation 920, the electronic device may check a temperature of the electronic device. As described above, the temperature of the electronic device may be checked using at least one of various sensors.

In operation 930, the electronic device may adjust the transmission power of at least one of the first communication module or the second communication module on the basis of the temperature checked in operation 920. Furthermore, in operation 930, the electronic device may adjust the transmission power of at least one of the first communication module or the second communication module on the basis of the network type or the antenna type of the communication module activated in operation 910.

Figure 10:
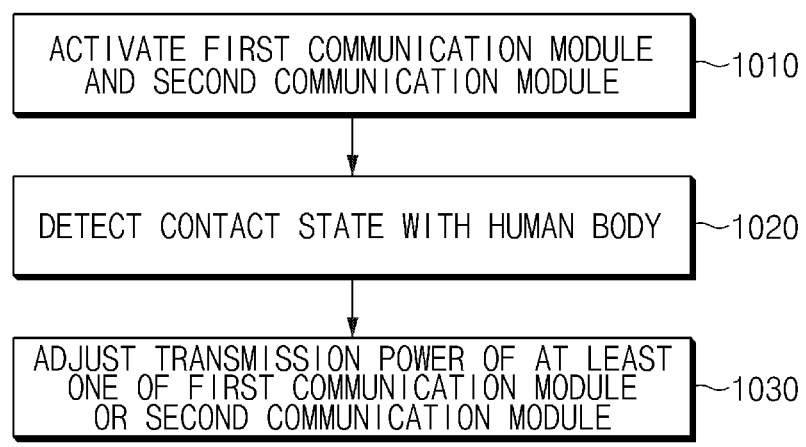
FIG. 10 is a flowchart illustrating a method of adjusting transmission power of a communication module by an electronic device according to another embodiment of the present disclosure.

Referring to FIG. 10, the electronic device may active the first communication module and the second communication module in operation 1010.

In operation 1020, the electronic device may detect the contact state between the electronic device and the human body. As described above, the contact state between the electronic device and the human body may be checked using at least one of various sensors.

In operation 1030, the electronic device may adjust the transmission power of at least one of the first communication module or the second communication module on the basis of the contact state between the electronic device and the human body checked in operation 1020. Furthermore, in operation 1030, the electronic device may adjust the transmission power of at least one of the first communication module or the second communication module on the basis of the network type or the antenna type of the communication module activated in operation 1010.

FIGS. 9 and 10 illustrate an embodiment in which the transmission power of the first communication module or the second communication module is adjusted in the case where the first communication module and the second communication module are activated.

Figure 11:
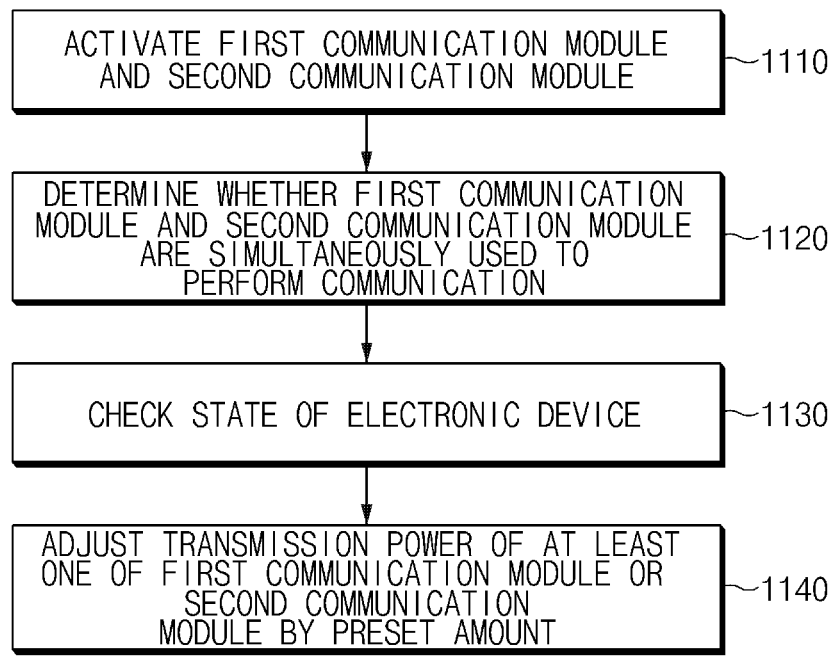
FIG. 11 is a flowchart illustrating a method of adjusting transmission power of a communication module by an electronic device according to another embodiment of the present disclosure.

Referring to FIG. 11, the electronic device may active the first communication module and the second communication module in operation 1110.

In operation 1120, the electronic device may determine whether the first communication module and the second communication module are simultaneously activated to perform communication.

In operation 1130, the electronic device may check a state of the electronic device. For example, the electronic device may check the temperature of the electronic device or the contact state between the electronic device and the human body.

In operation 1140, the electronic device may adjust, by preset amount as a whole, the transmission power of at least one of the first communication module or the second communication module on the basis of the state of the electronic device checked in operation 1130. Furthermore, in operation 1140, the electronic device may adjust the transmission power of at least one of the first communication module or the second communication module on the basis of the network type or the antenna type of the communication module activated in operation 1110. In addition, in operation 1140, the electronic device may adjust the transmission power of at least one of the first communication module or the second communication module on the basis of whether the first communication module and the second communication module are simultaneously activated.

Figure 12:
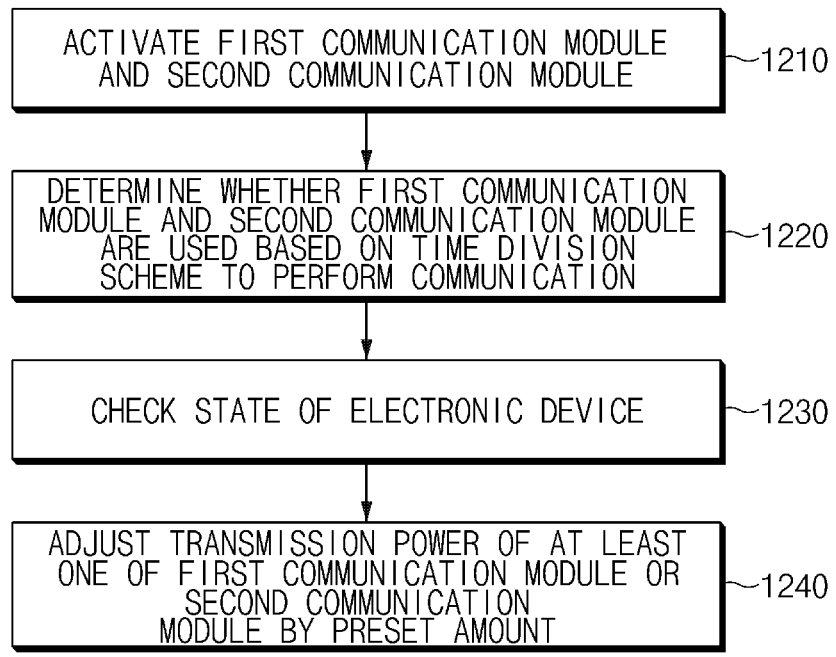
FIG. 12 is a flowchart illustrating a method of adjusting transmission power of a communication module by an electronic device according to another embodiment of the present disclosure.

Referring to FIG. 12, the electronic device may active the first communication module and the second communication module in operation 1210.

In operation 1220, the electronic device may determine whether the first communication module and the second communication module are activated at different times to perform communication.

In operation 1230, the electronic device may check a state of the electronic device. For example, the electronic device may check the temperature of the electronic device or the contact state between the electronic device and the human body.

In operation 1240, the electronic device may adjust, by preset amount as a whole, the transmission power of at least one of the first communication module or the second communication module on the basis of the state of the electronic device checked in operation 1230. Furthermore, in operation 1240, the electronic device may adjust the transmission power of at least one of the first communication module or the second communication module on the basis of the network type or the antenna type of the communication module activated in operation 1210. In addition, in operation 1240, the electronic device may adjust the transmission power of at least one of the first communication module or the second communication module on the basis of whether the first communication module and the second communication module are activated at different times.

FIGS. 11 and 12 illustrate an embodiment in which the transmission power of the first communication module or the second communication module is adjusted, by preset amount as a whole, according to a manner of activating the first communication module and the second communication module. The cases of adaptively adjusting the transmission power of the first communication module or the second communication module will be described with reference to FIGS. 13 and 14.

Figure 13:
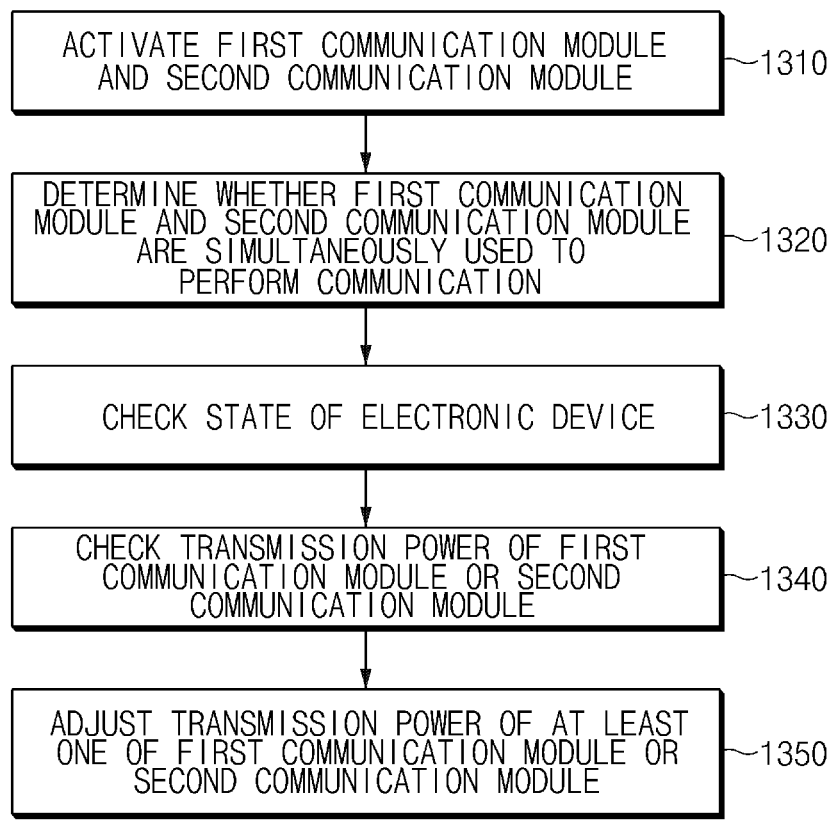
FIG. 13 is a flowchart illustrating a method of adjusting transmission power of a communication module by an electronic device according to another embodiment of the present disclosure.

Referring to FIG. 13, the electronic device may active the first communication module and the second communication module in operation 1310.

In operation 1320, the electronic device may determine whether the first communication module and the second communication module are simultaneously activated to perform communication.

In operation 1330, the electronic device may check a state of the electronic device. For example, the electronic device may check the temperature of the electronic device or the contact state between the electronic device and the human body.

In operation 1340, the electronic device may check the transmission power of the first communication module or the second communication module.

In operation 1350, the electronic device may adaptively adjust the transmission power of at least one of the first communication module or the second communication module on the basis of the state of the electronic device checked in operation 1330 or the transmission power of the first communication module or the second communication module checked in operation 1340. Furthermore, in operation 1350, the electronic device may adjust the transmission power of at least one of the first communication module or the second communication module on the basis of the network type or the antenna type of the communication module activated in operation 1310. In addition, in operation 1350, the electronic device may adjust the transmission power of at least one of the first communication module or the second communication module on the basis of whether the first communication module and the second communication module are simultaneously activated.

Figure 14:
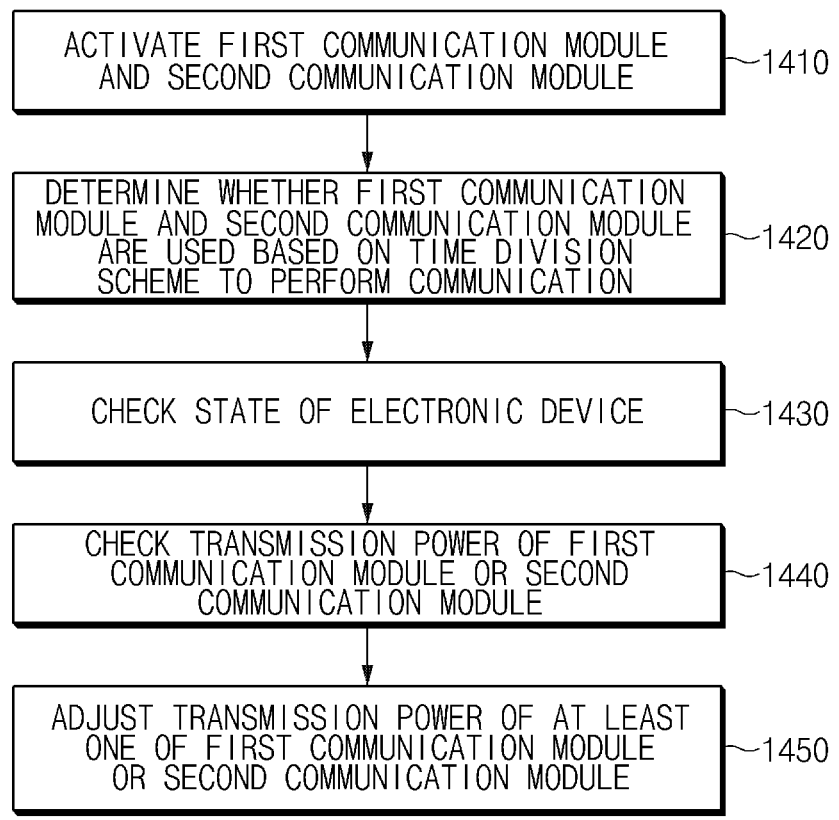
FIG. 14 is a flowchart illustrating a method of adjusting transmission power of a communication module by an electronic device according to another embodiment of the present disclosure.

Referring to FIG. 14, the electronic device may active the first communication module and the second communication module in operation 1410.

In operation 1420, the electronic device may determine whether the first communication module and the second communication module are activated at different times to perform communication.

In operation 1430, the electronic device may check a state of the electronic device. For example, the electronic device may check the temperature of the electronic device or the contact state between the electronic device and the human body.

In operation 1440, the electronic device may check the transmission power of the first communication module or the second communication module.

In operation 1450, the electronic device may adaptively adjust the transmission power of at least one of the first communication module or the second communication module on the basis of the state of the electronic device checked in operation 1430 or the transmission power of the first communication module or the second communication module checked in operation 1440. Furthermore, in operation 1450, the electronic device may adjust the transmission power of at least one of the first communication module or the second communication module on the basis of the network type or the antenna type of the communication module activated in operation 1310. In addition, in operation 1450, the electronic device may adjust the transmission power of at least one of the first communication module or the second communication module on the basis of whether the first communication module and the second communication module are activated at different times.

The methods of adjusting transmission power illustrated in FIGS. 13 and 14 are different from those illustrated in FIGS. 11 and 12 in that the transmission power is not adjusted as a whole. According to the methods of adjusting transmission power illustrated in FIGS. 13 and 14, the transmission power of the first communication module or the second communication module may be pre-checked so that the transmission power may be adaptively adjusted on the basis of the pre-checked transmission power.

Figure 15:
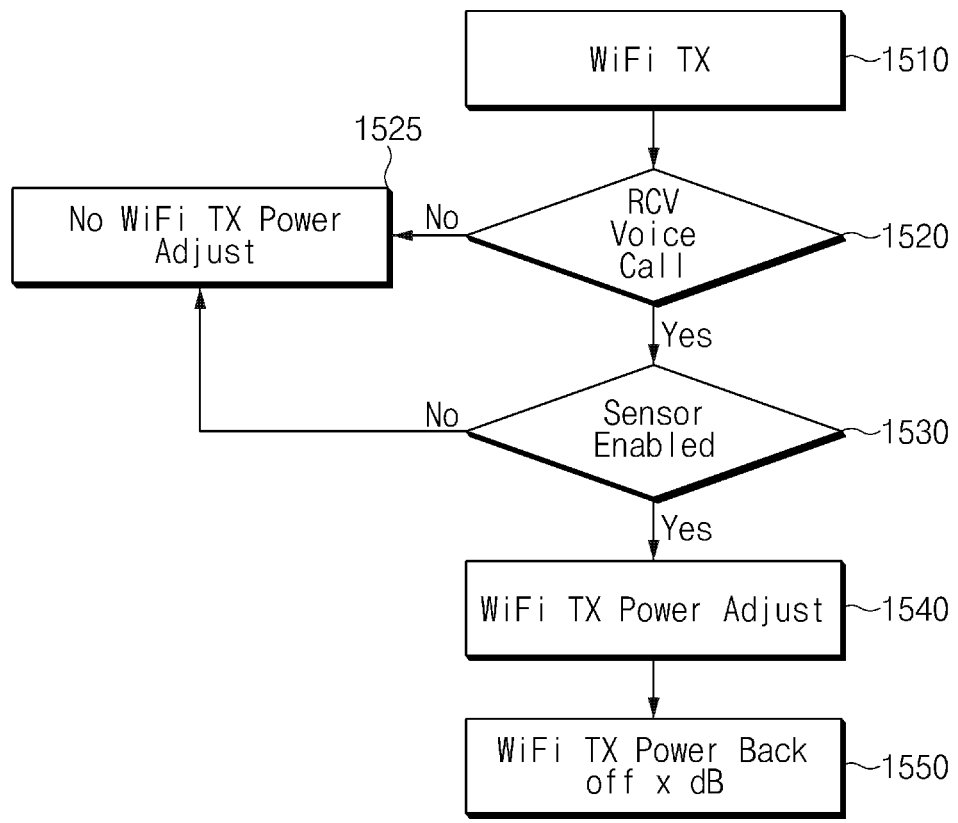
FIG. 15 is a flowchart illustrating a method of adjusting transmission power of a communication module by an electronic device according to another embodiment of the present disclosure.

FIG. 15 illustrates an example in which an electronic device adjusts the transmission power of a communication module while the user has a telephone conversation.

In operation 1510, the electronic device may activate a transmission module included in a communication module corresponding to a Wi-Fi network.

In operation 1520, the electronic device may determine whether an incoming/outgoing call is received or sent while a receiver is activated.

If the receiver is not activated, the electronic device may not adjust the transmission power of the transmission module corresponding to the Wi-Fi network in operation 1525.

If an incoming/outgoing call is received or sent while the receiver is activated, the electronic device may determine whether the electronic device contacts the human body in operation 1530. In this case, it may be determined using at least one of various sensors of the electronic device whether the electronic device contacts the human body.

If, for example, the electronic device does not contact the human body, the electronic device may not adjust the transmission power of the transmission module corresponding to the Wi-Fi network in operation 1525.

If, on the other hand, the electronic device contacts the human body, the electronic device may adjust the transmission power of the transmission module corresponding to the Wi-Fi network in operation 1540.

In operation 1550, the electronic device may decrease the transmission power of the transmission module corresponding to the Wi-Fi network by as much as a preset amount of x (dB) at one time.

In various embodiments, the electronic device may adjust the transmission power of a transmission module corresponding to a cellular network corresponding to an incoming/outgoing call. Furthermore, the electronic device may adaptively adjust the transmission power by checking current transmission power, without being limited to the case of adjusting the transmission power at one time.

Orders of the operations described above with reference to FIGS. 9 to 15 are merely examples, and are not limited thereto. That is, the orders of the above-mentioned operations may, as those of skill in the art will appreciate, be changed, and some of the operations may be performed simultaneously. Furthermore, the above-mentioned operations may be periodically performed at preset intervals, or may be performed again in response to an input from the user.

In various embodiments, at least a part of one or more devices (e.g., modules or functions thereof) or methods (e.g., operations) may be implemented as instructions stored in a tangible, non-transitory, computer-readable storage medium in the form of a programming module. In the case where the instructions are performed by at least one processor (e.g., the processor 210), the at least one processor may perform functions corresponding to the instructions. The computer-readable storage medium may be, for example, the memory 230. At least a part of the programming module may be implemented (e.g., executed) by the processor 210. At least a part of the programming module may include, for example, a module, a program, a routine, sets of instructions, and/or a process for performing at least one function.

The module or programming module according to various embodiments of the present disclosure may include at least one of the above-mentioned elements, or some elements may be omitted or other additional elements may be added. Operations performed by the programming module or the other elements may be performed in a sequential, parallel, iterative or heuristic way. Furthermore, some operations may be performed in another order or may be omitted, or other operations may be added.

The tangible, non-transitory, computer-readable storage medium may include a magnetic medium such as a hard disk, a floppy disk and a magnetic tape, an optical medium such as a compact disk read only memory (CD-ROM) and a digital versatile disc (DVD), a magneto-optical medium such as an optical disk, and a hardware device configured to store and execute program instructions (e.g., a programming module), such as a read only memory (ROM), a random access memory (RAM) and a flash memory. The program instructions may include machine language codes made by compilers and high-level language codes that can be executed by computers using interpreters. The above-mentioned hardware may be configured to be operated as one or more software modules for performing operations according to various embodiments of the present disclosure and vice versa.

As described herein, the amount of electromagnetic energy radiated from an electronic device may be controlled by adjusting the transmission power of a communication module of the electronic device, so that the human body may be protected or secure from the radiated electromagnetic energy and SAR criteria for the electronic device may be satisfied. Furthermore, heating of the electronic device may be reduced by adjusting the transmission power of the communication module, thereby improving the convenience of the user.

The above embodiments of the present disclosure are illustrative and not limitative. Various alternatives and equivalents are possible. Other additions, subtractions, or modifications are obvious in view of the present disclosure and are intended to fall within the scope of the appended claims.

What is claimed is:

1. A method performed by an electronic device, the method comprising:
   performing communication at a first transmission power using a first communication module;
   performing communication using a second communication module; and
   adjusting a transmission power of the first communication module from the first transmission power to a second transmission power for at least a part of time while performing communication using the second communication module,
   wherein the adjusting of the transmission power of the first communication module from the first transmission power to the second transmission power is performed on a basis of at least whether at least one speaker of the electronic device is activated.

2. The method according to claim 1, wherein the adjusting of the transmission power of the first communication module from the first transmission power to the second transmission power is performed on a basis of at least data obtained from at least one sensor of the electronic device.

3. The method according to claim 1, wherein the at least one speaker includes at least one receiver.

4. The method according to claim 1,
   wherein the at least one speaker includes a first speaker having a first maximum volume and a second speaker having a second maximum volume, the first maximum volume being less than the second maximum volume, and
   wherein the adjusting of the transmission power of the first communication module from the first transmission power to the second transmission power is performed on a basis of at least whether the first speaker is activated.

5. The method according to claim 1, wherein the first communication module includes a Wi-Fi communication module, and the second communication module includes a cellular communication module.

6. The method according to claim 1, wherein the adjusting of the transmission power of the first communication module from the first transmission power to the second transmission power indicates decreasing the transmission power of the first communication module from the first transmission power to the second transmission power by as much as substantially the same amount regardless of the transmission power of the first communication module.

7. The method according to claim 1, wherein the adjusting of the transmission power of the first communication module from the first transmission power to the second transmission power includes decreasing the transmission power of the first communication module from the first transmission power to the second transmission power by as much as an amount selected on a basis of at least the transmission power of the first communication module.

8. The method according to claim 1, wherein the adjusting of the transmission power of the first communication module from the first transmission power to the second transmission power comprises adjusting the first transmission power to substantially the same amount if the transmission power of the first communication module is equal to or larger than the substantially the same amount or exceeds the substantially the same value.

9. The method according to claim 1, further comprising: decreasing a transmission power of the second communication module for at least the part of time while performing communication using the second communication module.

10. The method according to claim 1, further comprising: changing the transmission power of the first communication module into a third transmission power for at least another part of the time while performing communication using the second communication module, wherein the third transmission power is different from the first transmission power and the second transmission power.

11. An electronic device comprising:
    at least one speaker;
    a first communication module configured to perform communication at a first transmission power;
    a second communication module configured to perform communication; and
    a control module configured to adjust a transmission power of the first communication module from the first transmission power to the second transmission power for at least a part of time while performing communication using the second communication module, on a basis of at least whether the at least one speaker is activated.

12. The electronic device according to claim 11, further comprising:
    at least one sensor configured to monitor the inside or the outside of the electronic device, and wherein the control module is further configured to adjust the transmission power of the first communication module from the first transmission power to the second transmission power is performed on a basis of at least data obtained from the at least one sensor.

13. The electronic device according to claim 11, wherein the at least one speaker includes at least one receiver.

14. The electronic device according to claim 11, wherein the at least one speaker includes a first speaker having a first maximum volume and a second speaker having a second maximum volume, the first maximum volume being less than the second maximum volume, and wherein the control module further configured to adjust the transmission power of the first communication module on a basis of at least whether the first speaker is activated.

15. The electronic device according to claim 11, wherein the first communication module includes a Wi-Fi communication module, and the second communication module includes a cellular communication module.

16. The electronic device according to claim 11, wherein the control module further configured to decrease the transmission power of the first communication module from the first transmission power to the second transmission power by as much as substantially the same amount regardless of the transmission power of the first communication module.

17. A non-transitory computer-readable recording medium having recorded thereon computer program codes to perform a method via a processor, wherein the method comprises
  performing communication at a first transmission power using a first communication module;
  performing communication using a second communication module; and
  adjusting a transmission power of the first communication module from the first transmission power to a second transmission power for at least a part of time while performing communication using the second communication module.
  wherein the adjusting of the transmission power of the first communication module from the first transmission power to the second transmission power is performed on a basis of at least whether at least one speaker is activated.

* * * * *